US008918576B2

(12) United States Patent
Bert et al.

(10) Patent No.: US 8,918,576 B2
(45) Date of Patent: Dec. 23, 2014

(54) SELECTIVELY PLACING DATA IN THERMALLY CONSTRAINED MEMORY SYSTEMS TO DYNAMICALLY ADAPT TO CHANGING ENVIRONMENTAL CONDITIONS

(75) Inventors: Luca Bert, Cumming, GA (US); Mark Ish, Atlanta, GA (US); Rajiv Ganth Rajaram, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 351 days.

(21) Appl. No.: 13/454,310

(22) Filed: Apr. 24, 2012

(65) Prior Publication Data

US 2013/0282950 A1 Oct. 24, 2013

(51) Int. Cl.
*G06F 12/00* (2006.01)
(52) U.S. Cl.
USPC .......................................................... 711/102
(58) Field of Classification Search
None
See application file for complete search history.

(56) References Cited

U.S. PATENT DOCUMENTS

| 8,111,514 | B2 | 2/2012 | Imsand | 361/714 |
|---|---|---|---|---|
| 8,116,075 | B2 | 2/2012 | Hall et al. | 361/679.33 |
| 8,380,942 | B1 * | 2/2013 | Corddry et al. | 711/154 |
| 2006/0041729 | A1 | 2/2006 | Rider et al. | 711/165 |
| 2008/0059775 | A1 | 3/2008 | Dang et al. | 712/221 |
| 2009/0077558 | A1 | 3/2009 | Arakawa et al. | 718/102 |
| 2011/0252248 | A1 | 10/2011 | Cameron et al. | 713/300 |
| 2011/0289274 | A1 * | 11/2011 | Olster | 711/114 |
| 2012/0054581 | A1 | 3/2012 | Grube et al. | 714/769 |

* cited by examiner

*Primary Examiner* — Brian Peugh
(74) *Attorney, Agent, or Firm* — Christopher P. Maiorana, PC

(57) ABSTRACT

A method for selectively placing cache data, comprising the steps of (A) determining a line temperature for a plurality of devices, (B) determining a device temperature for the plurality of devices, (C) calculating an entry temperature for the plurality of devices in response to the cache line temperature and the device temperature and (D) distributing a plurality of write operations across the plurality of devices such that thermal energy is distributed evenly over the plurality of devices.

20 Claims, 4 Drawing Sheets

SELECTIVELY PLACING DATA IN THERMALLY CONSTRAINED MEMORY SYSTEMS TO DYNAMICALLY ADAPT TO CHANGING ENVIRONMENTAL CONDITIONS

FIELD OF THE INVENTION

The present invention relates to memory storage generally and, more particularly, to a method and/or apparatus for selectively placing data in thermally constrained memory systems to dynamically adapt to changing environmental conditions.

BACKGROUND OF THE INVENTION

The availability of solid state devices (SSDs) that allow faster access to data is generating a high demand. New opportunities are developing to use SSDs as intermediate storage devices, such as cache memory systems. Such implementations generate demands for a subsystem that is both fast and protected, similar to typical HDD RAID demands. However, the power packed in the unit volume can be extremely high and often beyond the capacity of conventional cooling systems.

It would be desirable to selectively place data in thermally constrained systems to dynamically adapt to changing environmental conditions.

SUMMARY OF THE INVENTION

The present invention concerns a method for selectively placing cache data, comprising the steps of (A) determining a line temperature for a plurality of devices, (B) determining a device temperature for the plurality of devices, (C) calculating an entry temperature for the plurality of devices in response to the cache line temperature and the device temperature and (D) distributing a plurality of write operations across the plurality of devices such that thermal energy is distributed evenly over the plurality of devices.

The objects, features and advantages of the present invention include selectively placing data in thermally constrained systems that may (i) be implemented in a Solid State Device (SSD) subsystem, (ii) operate as a write-through (WT) or write-back (WB) storage cache, (iii) allow data protection and performance (e.g., support for RAID levels 1, 3, 5, etc.), (iv) cache data in an order that may optimize a power envelope and/or a cooling capability of the system, (v) be implemented as a cache subsystem, (vi) be implemented as a mass storage subsystem and/or (vii) dynamically adapt to changing environmental conditions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
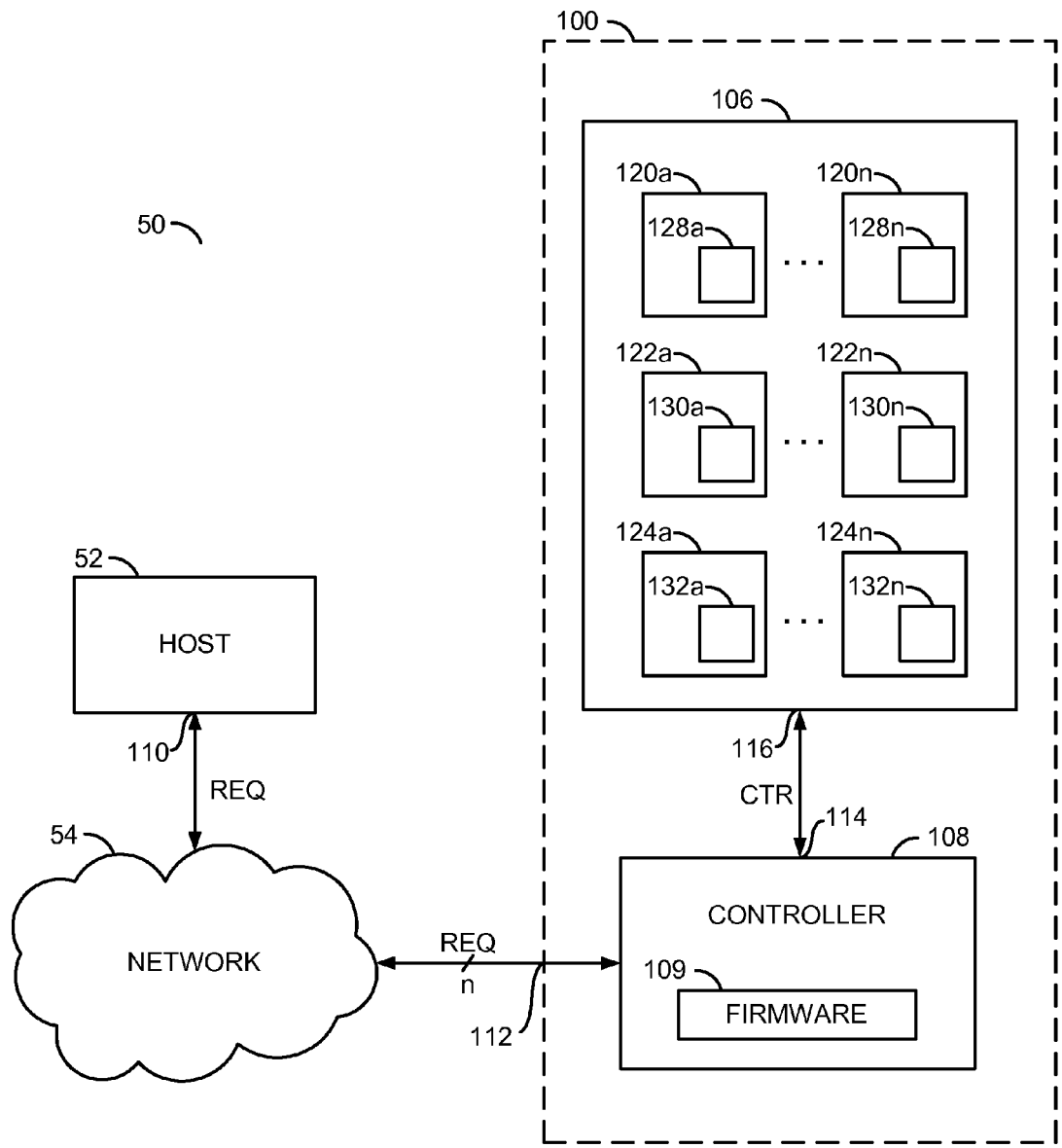
FIG. 1 is a diagram of a context of the present invention in the context of a mass storage subsystem.

Referring to FIG. 1, a block diagram of a system 50 is shown illustrating a context of the present invention. The system 50 generally comprises a block (or circuit) 52, a network 54, and a block (or circuit) 100. The circuit 100 generally comprises a block (or circuit) 106 and a block (or circuit) 108. The circuit 52 may be implemented as a host. The host 52 may be implemented as one or more computers in a host/client configuration. The circuit 106 may be implemented as an enclosure. The enclosure 106 may include a number of storage devices (e.g., a drive array). The circuit 108 may be implemented as a controller. In one example, the circuit 108 may be a RAID controller. The circuit 108 may include a block (or module, or circuit) 109. The block 109 may be implemented as firmware that may control the controller 108.

The host 52 may have an input/output 110 that may present a input/output request (e.g., REQ). The signal REQ may be sent through a network 54 to an input/output 112 of the controller 108. The controller 108 may have an input/output 114 that may present a signal (e.g., CTR) to an input/output 116 of the storage array 106. In the example shown, the host 52 is shown connected to the controller 108. However, in another example, the controller 108 may be implemented as a plug-in card that may be plugged into the host 52. The particular type of connection between the controller 108 and the host 52 may be varied to meet the design criteria of a particular implementation.

The storage array 106 may have a number of storage devices (e.g., drives or volumes) 120a-120n, a number of storage devices (e.g., drives or volumes) 122a-122n and a number of storage devices (e.g., drives or volumes) 124a-124n. In one example, each of the storage devices 120a-120n, 122a-122n, and 124a-124n may be implemented as a single drive, multiple drives, and/or one or more drive enclosures. The storage devices 120a-120n, 122a-122n and/or 124a-124n may be implemented as one or more hard disk drives (HDDs), one or more solid state devices (SSDs) or a combination of HDDs and SSDs. The storage devices 120a-120n may have corresponding firmware blocks 128a-128n. The storage devices 122a-122n may have corresponding firmware blocks 130a-130n. The storage devices 124a-124n may have corresponding firmware blocks 132a-132n. Redundancy may be provided if the data is striped across the drives 120a-120n, 122a-122n, and/or 124a-124n, such as in RAID 0, RAID 50, RAID 60, RAID 30, RAID 10 and/or RAID 01 volume groups. In an SSD implementation, each of the drives may include a number of individual memory modules (to be described in more detail in connection with FIG. 2). Each of the drives 120a-120n, 122a-122n and/or 124a-124n may report a temperature to the controller 108. For example, a command may be sent to the controller from each of the drives 120a-120n, 122a-122n and/or 124a-124n that reports a temperature. In another example, an independently implemented temperature sensor may be provided on each of the drives 120a-120n, 122a-122n and/or 124a-124n.

Figure 2:
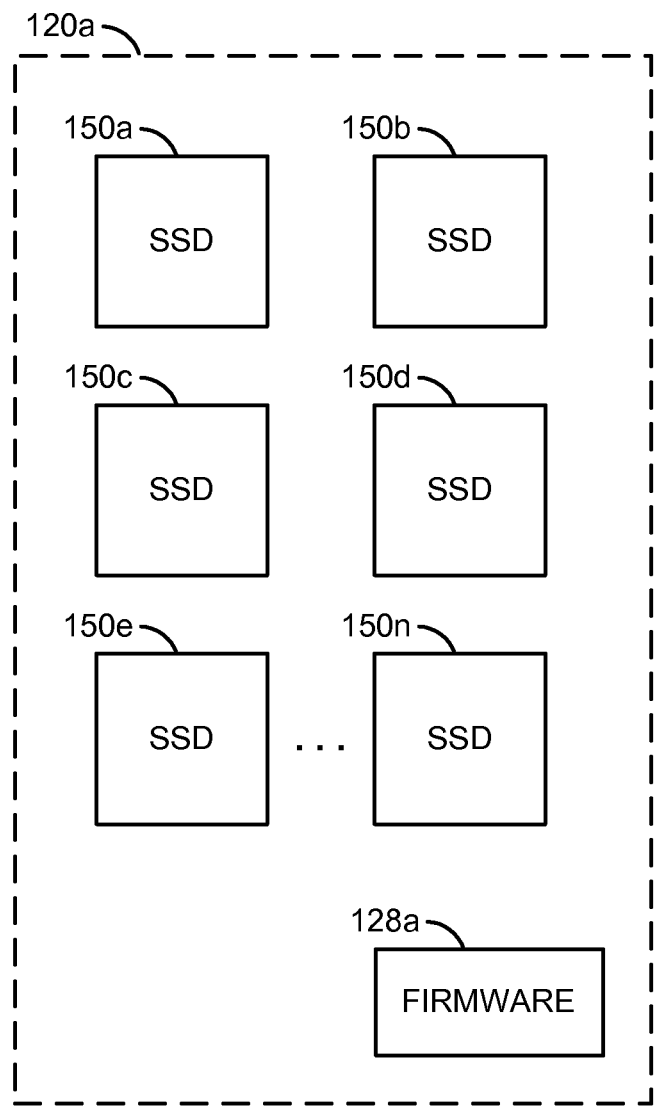
FIG. 2 is a more detailed diagram of one of the storage devices.

Referring to FIG. 2, a more detailed diagram of one of the drives (e.g., 120a) is shown. The drive 120a is shown comprising a number of modules 150a-150n. Each of the modules may be implemented as a separate solid state module. In one example, each of the modules 150a-150n may provide an independent temperature reading of each of the modules 150a-150n. The firmware 128a may control how data is written to each of the modules 150a-150n. The firmware 109 may distribute data between each of the individual drives 120a-120n, 122a-122n and 124a-124n accounting for the power considerations, while the firmware 128a may distribute data to each of the individual modules 150a-150n to respond to heat and/or power considerations.

Figure 3:
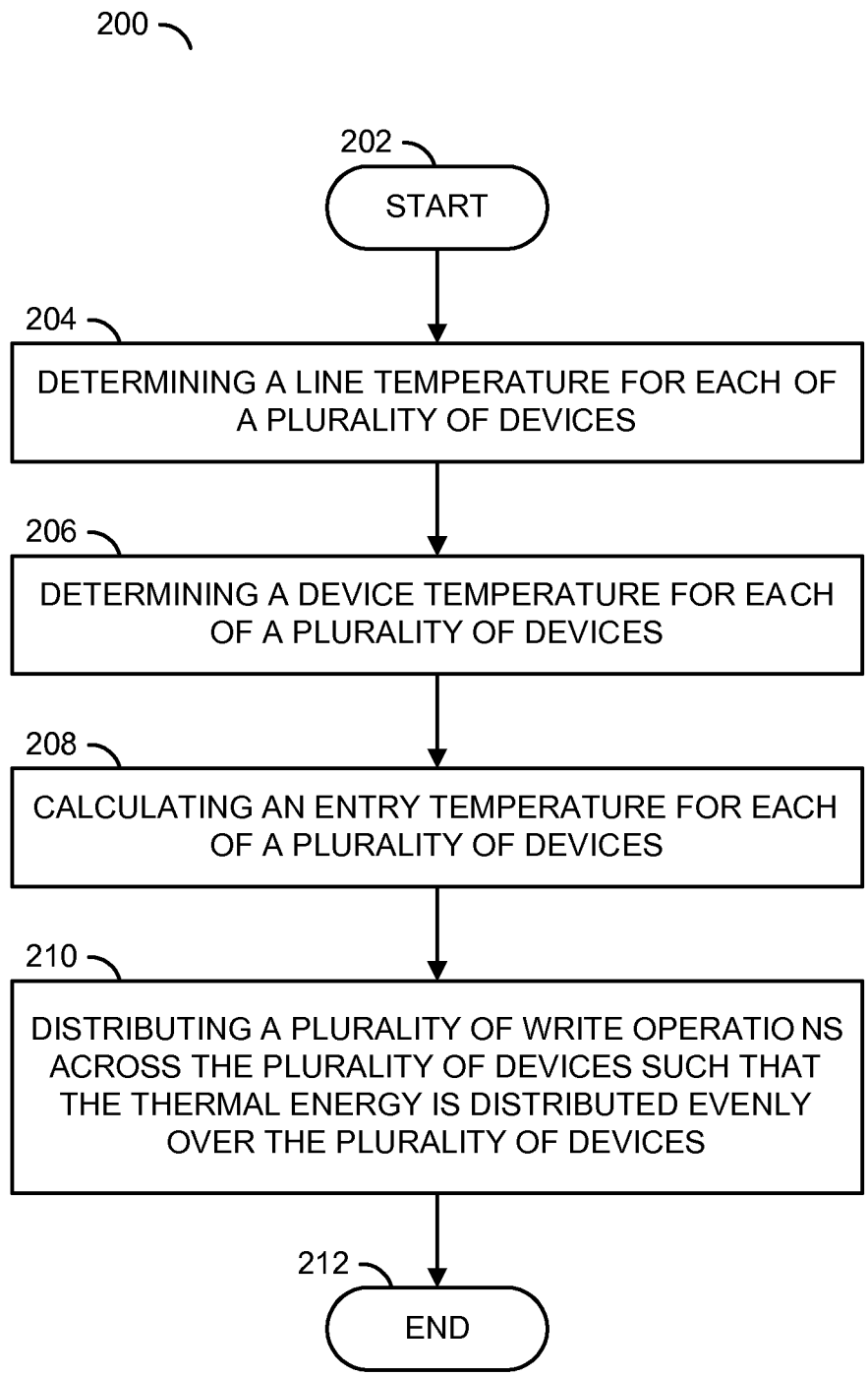
FIG. 3 is a flow diagram of an example implementation of the present invention.

Referring to FIG. 3, a flow diagram of a method (or process) 200 is shown. The method 200 generally comprises a step (or state) 202, a step (or state) 204, a step (or state) 206, a step (or state) 208, a step (or state) 210, and a step (or state) 212. The state 202 may be a start state. The state 204 may determine a line temperature for each of a plurality of devices. The state 206 may determine a device temperature for each of the plurality of devices. The step 208 may calculate an entry temperature for each of the plurality of devices. The step 210 may distribute a plurality of write operations across the plurality of devices such that thermal energy is distributed relatively evenly over the plurality of devices. The step 212 may be an end step. In one example, the method 200 may be implemented on a per cache line basis. In another implementation, the method 200 may be implemented on a per drive basis. In yet another example, the method 200 may be implemented on a per device basis. For example, the devices 150a-150n may be used to implement the drive 120a. Distributing thermal energy within the particular drive 120a may be useful to avoid overheating any one of the modules 150a-150n.

Figure 4:
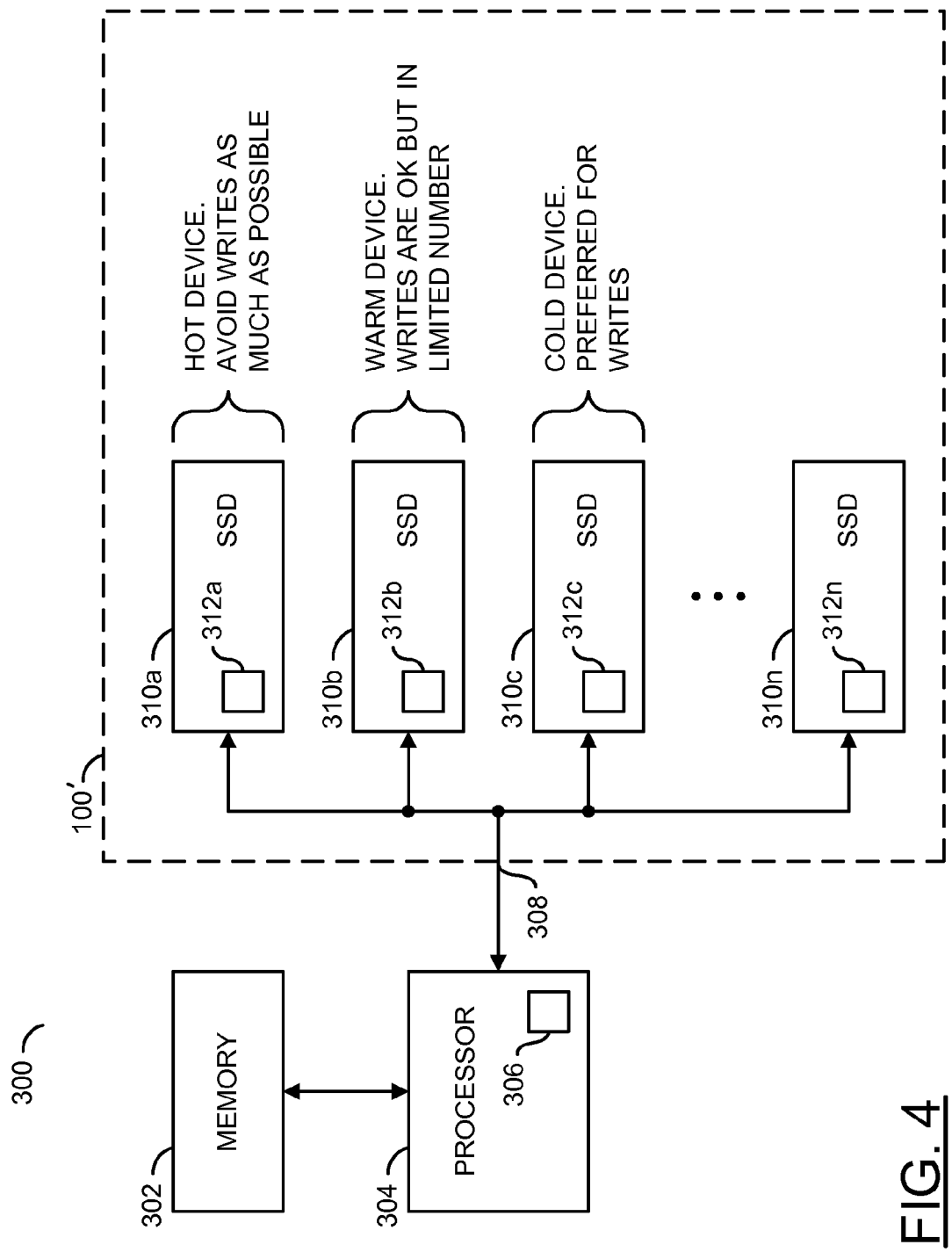
FIG. 4 is a diagram of a context of the present invention in the context of a cache memory subsystem.

Referring to FIG. 4, a block diagram of a system 300 is shown implementing an alternate embodiment. The system 300 generally comprises a block (or circuit) 302, a block (or circuit) 304 and a block (or circuit) 100'. The block 302 may be implemented as a memory. The block 304 may be implemented as a processor. The processor 304 may include a firmware block 306. The firmware block 306 may control reading and/or writing data to the subsystem 100'. The firmware block 306 may also control distributing write operations in the subsystem 100'. A bus 308 may connect the processor 304 to the subsystem 100'. The block 100' may be implemented as a cache memory subsystem.

The block 100' generally comprises a number of SSD modules 310a-310n. Each of the modules 310a-310n may have a temperature sensor 312a-312n. The temperature sensors 312a-312n may send temperature information to the processor 304 in a number of ways. In one example, the temperature information may be sent as a code (e.g., an OP code) along with input/output requests and/or data sent between the processor 304 and the block 100'. In another example, a separate wire (or trace) may be connected between the sensors 312a-312n and the processor 304. In another example, each of the devices 310a-310n may have a plurality of sensors 312a-312n. For example, one sensor may be implemented on a top side of the device 310a, while another temperature sensor may be implemented on the bottom side of the device 310a. In such an implementation, if one side of the device is hotter than the other side of the device, the process 200 may dynamically adjust how data is written (e.g., how data writes are distributed in response to particular temperature readings). The particular number of sensors may be varied to meet the design criteria of a particular implementation.

The SSD cache subsystem 100 may be built around a pool of the SSD devices 310a-310n. The storage connectivity between the devices 310a-310n may be implemented using one of a variety of attachment protocols (e.g., PCIe, fiber channel, etc.). The particular protocol implemented is normally protected by a redundancy mechanism. In one example, such protection may be implemented as a RAID5 (e.g., R5). Other derivative redundancy schemes (e.g., R0/1 (which may be considered a subset of R5 and/or R6) or other more general Erasure Codes) may also be implemented.

In the example of an SSD R5 volume, a cache manager may be implemented as part of the firmware 306 that may allocate data according to a number of policies. A number of such schemes may be implemented. In one example, a write-back (WB) caching model may be used. In another example, a write-through (WT) caching model may be used. The particular type of caching model implemented may be varied in a design criteria of a particular implementation.

The subsystem 100 (or 100') may be implemented to maximize an even spreading of thermal energy. Even spreading may be referred to as managing the thermal energy in each of the devices to be within a predetermined parameter. For example, a target of evenly distributing the thermal energy within 10% may be implemented. However, the particular target percentage may be varied to meet the design criteria of a particular implementation. Some of the drives 120a-120n, 122a-122n, and/or 124a-124n (or 310a-310n) may be hotter than others. The data placement may be implemented to place new data on cooler devices. The subsystem 100 (through the firmware 109 or 306) may consider that write operations (and relative erase operations implemented to allow writes) generally consume the most power. Read operations are generally neutral from a power profile (e.g., minimal impact on power profile and often unavoidable).

The subsystem 100 (or 100') may also maximize write performance operations. For the cache subsystem 100', write performance may be limited by how writes are performed. As a general case, a protected subsystem may implement 4 I/O requests to write a data field and a protection field. A higher number may be implemented for an R6 redundancy. Erasure codes may be smaller in the subset case for R1. When a Full Stripe Write (FSW) is implemented, that will generally guarantee any write may be accomplished with a single I/O request per each physical device constituting the theoretical minimum number of accesses to maximize performance. The temperature in the memory subsystem 100 (or 100') may be analyzed using any of a number of techniques, some to be described below.

A Cache Line Temperature (CLT) value (or parameter) may be considered a logical construct stating how often a data operation is re-used from the cache (how "hot"). The need to keep such data cached is proportionally higher as the CLT parameter increases. Hot data are more likely to be re-used than cold data. A CLT value may be different for each cache line, regardless of where data is cached.

A Cache Device Temperature (CDT) value may be considered a physical report of a thermal reading of each SSD. The CDT value may be a function of the device placement and/or cooling environment. A physically hotter device is more prone to reach a level in which the device is no longer functional. Physically hot devices may be targeted to have fewer writes (compared with devices that are not physically hot) to let the cache 100' stabilize and/or cool. The CDT value may be different for each of the physical devices regardless of where the particular data is stored.

A Cache Entry Temperature (CET) value may be defined as:

$$CET = a*CLT + b*CDT$$

Where "a" and "b" are appropriately calculated multipliers used to normalize the CET value to a convenient level. For example, if a cache is implemented with 16 cache lines, the temperature value may be a value in the range of 0-15. A multiplier of "A" may be implemented that may translate the temperature value to a physical environment. For example, if an operating range has a ratio of 0-100, and the cache is placed in a ratio of ½ (~50) compared to a data temperature value (or cache line value CLT), and a ratio of ½ (~50) compared to a device temperature value CDT, then "A"-~3.4, since 3.4*15-~=50.

From an overall standpoint, the higher the CET value, the more important that the cached data are retained in cache.

Either because such data are logically hot (e.g., a cache line) or because the device that the data reside on is physically hot. Either case may lead to minimizing further writes until cooling occurs.

To further normalize the CET value in practical terms, and with an even closer virtual temperature relationship, the CET value may be bound to be 0<=CET<=100 where, for example:

0 (e.g., a lower value) may indicate the data are not going to be needed any further and may be replaced or managed by the cache manager 306 for non-thermal considerations.

100 (a hot value) may mean the data should be retained regardless of other factors.

A rough environment on how to manage the cache may be implemented as a further segment. For example, a finer threshold may be implemented for easier management that may be expressed as, for example:
0-25: always replace
25-50: replace 2 out of 3 times
50-75: replace 1 out of 3 times
75-100: never replace The above brackets are shown for illustrative purposes only. The particular type of scoring system used may be varied to meet the design criteria of a particular implementation.

Another factor that may be important from a performance standpoint concerns what to do with data that fails the above tests (e.g., a cache line that needs to be replaced from a caching policy standpoint but is on a device that is too hot from a thermal standpoint).

In one aspect, such a conflict may be handled as a cache line that is hot, but should be kept for logical reasons. In such a case, the cache manager 109 may keep the line valid and move on to test the next line until the entire stripe is complete.

For example, a cache may be implemented as 4 SSD devices (e.g., S0-S3) that are arranged as in the following TABLE 1:

TABLE 1

| S0 | S1 | S2 | S3 |
|----|----|----|----|
| D0 | D1 | D2 | P0 |
| D3 | D4 | P1 | D5 |
| D6 | P2 | D7 | D8 |
| P3 | D9 | D10 | D11 |
| D12 | D13 | D14 | P4 |

In such an example, the cache line may be as big as a Dx entry (e.g., 64 KB in general but can vary).

A number of examples may be analyzed. For example, the S2 SSD may be hot to the point of failing the CET test (e.g., always keep/never replace). A first cache line may be allocated to D0 which is cool—good. A second cache line may be allocated to D1 which is cool—good. A third cache line may be allocated to D2 which is hot—fail. In this case the line may skip S2, then the line may skip S3 (as it is parity) and the line will be allocated to D3.

At this point the first cache line is complete (D0 and D1 are the new cache entries), D2 may be read from an SSD if not yet in memory—reads do not significantly affect temperature—P0 may be calculated as full stripe write—not writing D2 as it is already on the SSD—and the minimum amount of IO and maximum performance point is kept.

Next, analysis of the next stripe is described. Third cache line was already allocated above to D3—good. Fourth cache line will be allocated to D4 which is cool—good. Fifth cache line will be allocated to D5 which is cool—good.

Stripe is complete, FSW can be accomplished. Note that P1 needs to be written on S2 even if S2 is hot. Such an occurrence normally only happens, on average, 25% of the time and as such reduces the write load on S2 by 75%. This needs to be accounted for in the selection of "a" and "b" terms above. The process can be continued to all the lines in similar fashion.

In general, there may be situations when writes on any device, regardless of the temperature, cannot be avoided. For example, when the device has a parity. Another example may occur when the device does not require a new line placement but an update of an existing line. Both situations may be further optimized with similar techniques as described above.

The functions performed by the diagram of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method for selectively placing cache data, comprising the steps of:
   (A) determining a line temperature for a plurality of devices;
   (B) determining a device temperature for said plurality of devices;
   (C) calculating an entry temperature for said plurality of devices in response to said line temperature and said device temperature; and
   (D) distributing a plurality of write operations across the plurality of devices such that thermal energy is distributed evenly over the plurality of devices.

2. The method according to claim 1, wherein said line temperature comprises a cache line temperature, said device temperature comprises a cache device temperature and said entry temperature comprises a cache entry temperature.

3. The method according to claim 2, wherein said cache line temperature comprises a calculation of how often data is written to a particular cache line.

4. The method according to claim 2, wherein said cache device temperature comprises a physical reading of a cache device.

5. The method according to claim 4, wherein said physical reading comprises a temperature reading of said device.

6. The method according to claim 2, wherein said cache device temperature comprises a temperature reading from a plurality of locations of a cache line.

7. The method according to claim 1, wherein step (A) comprises determining a number of times data is written to each of said devices.

8. The method according to claim 1, wherein said plurality of devices each comprise cache memory cells.

9. The method according to claim 1, wherein said plurality of devices are configured as a redundant array of inexpensive disks (RAID).

10. The method according to claim 1, wherein said distribution of said plurality of writes is dynamically adapted in response to changes in said entry temperature.

11. An apparatus comprising:
    a processor configured to present/receive data through a bus; and
    a memory sub-system configured to read/write data from said processor through said bus, wherein (A) said memory sub-system comprises a plurality of memory elements each configured to present a line temperature reading to said processor, and (B) said processor is configured to (i) determine a device temperature for said plurality of memory elements, (ii) calculate an entry temperature for said plurality of memory elements in response to said line temperature and said device temperature, and (iii) distribute a plurality of write operations across the plurality of memory elements in response to said entry temperature such that thermal energy is distributed evenly over the plurality of memory elements.

12. The apparatus according to claim 11, wherein said plurality of memory elements each comprise a solid state drive.

13. The apparatus according to claim 12, wherein each of said drives comprises a plurality of solid state storage elements.

14. The apparatus according to claim 11, wherein said plurality of memory elements are configured as a redundant array of inexpensive disks (RAID).

15. The apparatus according to claim 11, wherein said distribution of said plurality of writes is dynamically adapted in response to changes in readings of said entry temperature.

16. The apparatus according to claim 11, wherein said line temperature comprises a cache line temperature, said device temperature comprises a cache device temperature and said entry temperature comprises a cache entry temperature.

17. The apparatus according to claim 16, wherein said cache line temperature comprises a calculation of how often data is written to a particular cache line.

18. The apparatus according to claim 16, wherein said cache device temperature comprises a physical temperature reading of a cache device.

19. The apparatus according to claim 16, wherein said cache device temperature comprises a temperature reading from a plurality of locations of one of said memory elements.

20. An apparatus comprising:
    an interface configured to process a plurality of read/write operations to/from a memory sub-system, wherein said memory sub-system comprises a plurality of memory elements each configured to present a line temperature reading to a bus; and
    a control circuit configured to (i) present/receive data through said bus, (ii) determine a device temperature for said plurality of memory elements, (iii) calculate an entry temperature for said plurality of memory elements in response to said line temperature and said device temperature, and (iv) distribute said plurality of read/write operations across said plurality of memory elements in response to said entry temperature such that thermal energy is distributed evenly over said plurality of memory elements.

* * * * *